April 3, 1945. C. E. ELLIS 2,372,940
BACK SIPHONAGE PREVENTION VALVE
Filed April 7, 1941 2 Sheets-Sheet 1

INVENTOR.
CLARENCE E. ELLIS.
BY *William E. Hall*
ATTORNEY.

April 3, 1945.   C. E. ELLIS   2,372,940
BACK SIPHONAGE PREVENTION VALVE
Filed April 7, 1941   2 Sheets-Sheet 2

INVENTOR.
CLARENCE E. ELLIS
BY
*William E. Hall*
ATTORNEY.

Patented Apr. 3, 1945

2,372,940

UNITED STATES PATENT OFFICE 2,372,940

BACK SIPHONAGE PREVENTION VALVE

Clarence E. Ellis, Los Angeles, Calif.

Application April 7, 1941, Serial No. 387,213

18 Claims. (Cl. 277—1)

My invention relates to a back siphonage prevention valve or valve structure.

One of the principal objects of this invention is to provide a valve of this class which, when inserted in a water or other main, as a service valve to a residence, manufacturing plant, or the like, will prevent the back flow or return of water from the residence, plant, or the like, if the water pressure at the latter location becomes greater than in the main, or if the pressure in the latter drops below the pressure in the former.

Another important object of this invention is to provide a valve of this class having a double check valve at the inlet and outlet of the structure for normally shutting off both inlet and outlet, but allowing water to flow from the inlet to the outlet, and which will cause another or bleeder valve temporarily or permanently to open when the pressure at the outlet end is greater than at the inlet end, and when the check valve at the outlet or discharge end leaks.

An important object also of this invention is to provide a valve structure of this class having a manual means for shutting off both inlet and outlet at all events, and for operating the bleeder valve for the purposes mentioned.

A further important object of this invention is to provide a valve of this class which is provided with a vacuum breaker valve in association with a bleeder valve, to facilitate the functioning of the latter, and in which the latter or bleeder valve is combined with a vacuum breaker valve for simultaneous operation of the two latter valves.

Still another object of this invention is to provide a novelly constructed and operated diaphragm valve which serves as a multiple-seat check and shut-off valve.

A still further object of this invention is to provide a valve of this class which is particularly simple, economical, durable, and efficient of manufacture and operation, and which will not readily get out of order.

With these and other objects in view, as will appear hereinafter, I have devised a back siphonage prevention valve structure, having certain novel features of construction, combination, and arrangement of parts and portions for performing the intended functions, as will be hereinafter described in detail and particularly set forth in the appended claims, reference being had to the accompanying drawings and to the characters of reference thereon, which form a part of this application, in which:

Figure 1:
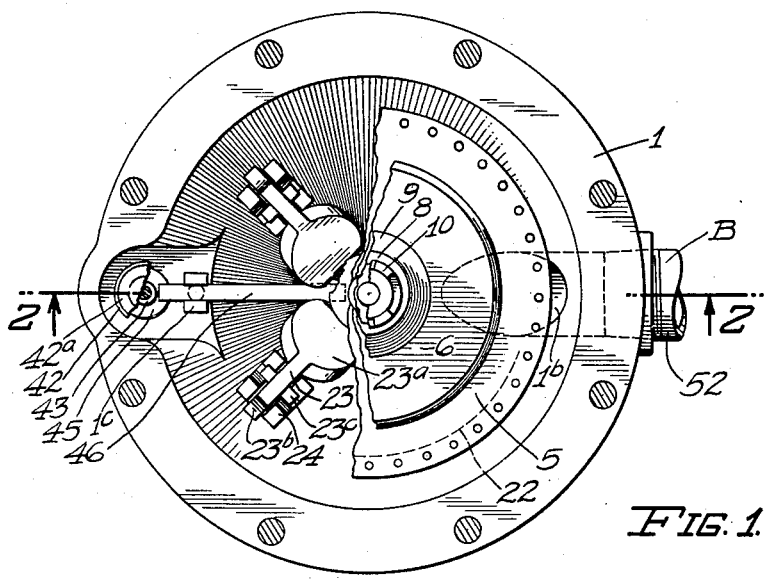
Fig. 1 is a sectional view in plan of my valve in a preferred form of construction, with a portion of the section taken on the line 1—1 of Fig. 2.

The housing for my valve consists preferably of a lower housing member 1 and an upper housing member 2, which may be secured together at their peripheries in any suitable manner. At the axial portion of the upper housing member 2 is provided an inlet connection 2ª having an axial bore 2ᵇ. At the axial portion of the lower housing member 1 is mounted the bleeder valve, as will be described hereafter, the lower housing member being provided with an axial bore 1ª for such valve. At one side of the lower casing member is provided an outlet or discharge connection 1ᵇ. At the side of the housing member 2, opposite the discharge connection of the member 1, is located a vacuum breaker valve, as will be also described hereafter. The upper housing member 2 has a boss 2ᶜ having an axial bore 2ᵈ to locate the vacuum breaker valve and to connect the interior of the housing with the atmosphere.

In the bore 1ª is reciprocably mounted the stem 3ª of the bleeder valve 3, the valve portion being provided at the inner end of the stem. To the upper end of the bleeder valve, and in axial alignment therewith is a hollow stem 4 which carries the diaphragm or diaphragm valve. This diaphragm valve consists of a diaphragm 5 supported at its axial portion on a flange 4ª at the upper end of the tubular member or stem 4. This diaphragm is secured to the upper end of the tubular stem by means of a disc 6, the diaphragm being forced against the underside of the disc by pressure from within the valve housing. At and around the inner end of the bore 2ᵇ is provided a valve seat 7 which is adapted to be engaged by an annular valve member 8 carried in a valve holder 9. The valve member 8 is guided with respect to its seat 7 by means of a guide 10 secured to the upper end of and coaxially with the valve holder. The valve holder 9 has a downwardly extending stem 11, around which is placed a coil spring 12, both the stem 11 and the coil spring 12 being located within the hollow portion which is located at the axial portion and upper end of the valve stem 4.

The peripheral portion of the diaphragm is adapted to seat against a plurality of closely positioned concentric seats or ridges 21 at the inner side of and diametrically outwardly from the seat 7 but inwardly from the secured portion of the upper housing member 2. At the underside of the peripheral portion of the diaphragm, which is adapted to engage the seats 21, is a ring 22, whereby the diaphragm is forced against the seats 21. Within the housing are pivoted a plurality of levers 23 which are provided at their inner ends with weights 23$^a$. The outer ends 23$^b$ of these levers are adapted to engage the under side of the ring 23. Intermediate the ends of the levers 23, and at the opposite sides thereof are knife-edge trunnions 23$^c$ which support the levers in V-shaped grooves at the upper ends of spaced lugs 24.

The lower housing member 1 has a pair of spaced depending brackets 31 which are positioned at the opposite sides of the bore 1$^a$. Between the brackets 31 is pivoted a weighted valve operating lever 32, the lever being provided at its opposite sides with trunnions 32$^a$ which extend into vertical slots 31$^a$ in the brackets 31, said slots extending longitudinally with respect to the brackets. At the lower ends of the brackets are provided adjusting screws 35 for adjusting the lower positions of the trunnions within the slots.

The pivoted end of the lever 32 has a cam portion 32$^b$ which is adapted to engage the lower end of the stem 3$^a$ of the bleeder valve. The stem 3$^a$ is preferably fluted or otherwise longitudinally undercut to permit fluid to pass outwardly or drain from the interior of the valve past the stem of the bleeder valve 3$^a$.

At the inner end of the bore 1$^a$ is an annular valve seat 33 which is adapted to be engaged by the annular valve member 3$^b$ carried by the valve portion of the bleeder valve 3.

At the inner end of the bore 2$^d$ is an annular valve seat 41 which is adapted to be engaged by an annular valve member 42$^a$ carried by the vacuum breaker valve 42. The valve 42 is secured to the upper end of a stem 43 by a guide 44 which is guided axially in the bore 2$^d$ of the boss 2$^c$. Intermediate the ends of the stem 43 is a collar 45 which is adapted to be engaged at the upper side by one end of a lever 46 pivoted intermediate its ends within the housing. The other end of the lever 46 is adapted to be engaged by the upper side of the valve portion of the bleeder valve 3. Thus, when the bleeder valve is raised, the vacuum breaker valve is forced downwardly and away from its seat 41.

The purpose of the vacuum breaker valve is to break the vacuum in the valve housing to permit proper function of the bleeder valve.

Over the upper end of the bore 2$^d$ is provided a cap 47, the same being secured to the upper end of the boss 2$^c$ To the outlet end of the valve housing, namely to the outlet connection 1$^b$, is connected a check valve 51, by means of a nipple 52. The check valve 51 is intended to prevent the return of water, to the water main A, from the service line B, that is, back to and through the inlet connection.

The operation of the valve is as follows:

When the valve is in condition to be operated, but is not operated, all valves are closed. During normal operation of the valve, that is, when water flows from the inlet to the outlet, the valve 8 is forced against the compression of the spring 12 and unseated, permitting the water to unseat the peripheral portion of the diaphragm valve 5 from the circular seats 21; the water then flows through the discharge connection 1$^b$ through the check valve 51. Although these valves are normally closed by spring or gravity action, they are forced to their closed positions by difference of fluid pressure, namely, if the pressure of the water in the service line B, connected with the check valve 51, should be increased above that of the pressure in the main A, or if the pressure in the main should drop below that of the service line.

In the event of such difference of pressure, either by greater pressure at the bottom of the diaphragm or less pressure at the top, the diaphragm will be forced tightly against its multiplicity of seats, and the center portion of the diaphragm will be raised, opening the bleeder valve 3 and the vacuum breaker valve 42. The opening or raising of the valve 3 permits the weighted lever 32 to drop because of its weight. By means of the adjusting screws 35, the pivoted axis of the lever may be raised or lowered. When in a high position, the free end of the lever 32 will not be permitted to drop to such a position that the cam will lock the bleeder valve in an unseated position, but the bleeder valve will be again closed when normal pressure is re-established. When the pivotal axis of the lever is lowered, the raised position of the stem 3$^a$ of the bleeder valve will allow the cam 32$^b$ to be located below the end of the stem 3$^a$, locking the bleeder valve 3 and the vacuum breaker valve 42, in their open positions, and causing the peripheral portion of diaphragm to engage with greater force the concentric circular seats 21 on the housing member 2, and forcing the valve 8 to be locked in its closed position. The weighted levers 23 also add to the seating force of the diaphragm valve against the circular seats 21.

Figure 2:
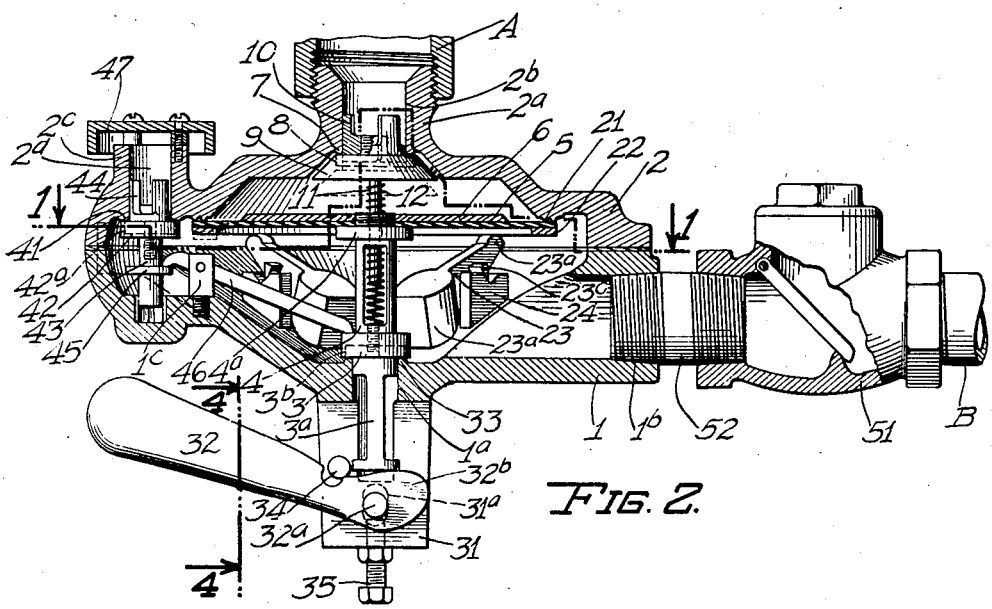
Fig. 2 is a sectional elevation taken through 2—2 of Fig. 1, showing the structure for normal operation, and showing by dotted lines certain of the valves unseated to permit passage of the water from the inlet to the discharge opening.
Figures 3, 4:
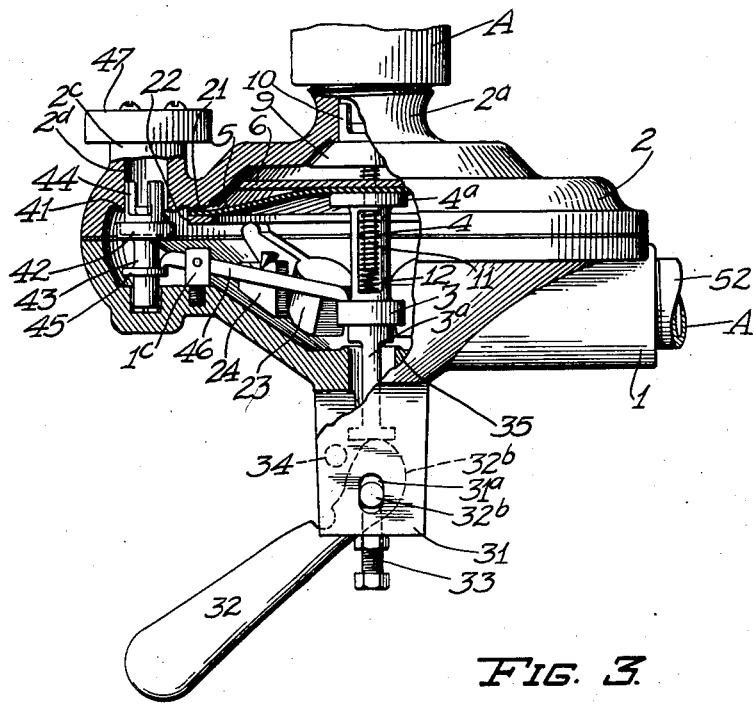
Fig. 3 is a sectional elevational view similar to that of Fig. 2, showing both the bleeder valve and the vacuum breaker valve unseated; and, Fig. 4 is a fragmentary sectional elevation taken through 5—5 of Fig. 2, showing the lower portion of the valve.

The raised position of the lever 32, about its pivotal axis, may be limited by a pin 34, as shown in Fig. 2.

If any leak occurs past the check valve 51 into the housing, because of the greater pressure on the service side of the valve, such overflow or leak is permitted to drain from or past the bleeder valve 3.

The action of the closing and opening of the various valves is similar when the weighted lever 32 is manually operated or automatically forced downwardly.

The vacuum breaker valve is particularly important when it is desired manually to force the lever 32 downwardly to unseat the bleeder valve and close the inlet, by forcing the valve 8 and the diaphragm valve 5 against their respective seats.

It will be here noted that the vacuum breaker valve is normally closed by reason of the water pressure within the valve housing, and that there is little resistance to the opening of this valve when the bleeder valve is opened.

Though I have shown and described a particular construction, combination, and arrangement of parts and portions, I do not wish to be limited to the same, but desire to include in the scope of my invention the construction, combination, and arrangement substantially as set forth in the appended claims.

I claim:

1. In a valve structure, a housing having an inlet and an outlet, a frame reciprocably mounted within the housing between the inlet and outlet, a diaphragm carried by the frame, said housing having a multiple seat surrounding the inlet, the peripheral portion of the diaphragm being adapted to engage said multiple seat, a plurality of levers mounted intermediate their ends within the housing, the inner ends of the levers being weighted and the outer ends of the levers engaging the peripheral portion of the diaphragm for urging the same against said multiple seat.

2. In a valve of the class described, a housing having an inlet and an outlet connection, a check valve at the inlet connection to prevent water from returning from the housing to the inlet, a bleeder valve positioned in axial alignment with the check valve for closing an opening in the housing opposite the inlet, a spring tending to separate the bleeder valve and the check valve for seating both valves, and a diaphragm valve coaxial with the check valve and the bleeder valve and movable with the latter, said housing having concentric seats axially inwardly and diametrically outwardly from the check valve, the concentric seats being engageable by the peripheral portion of the diaphragm valve, said bleeder valve being unseated when the diaphragm valve is forced in the direction of the concentric seats.

3. In a valve of the class described, a housing having an inlet and an outlet connection, a check valve at the inlet connection to prevent water from returning from the housing to the inlet, a bleeder valve positioned in axial alignment with the check valve for closing an opening in the housing opposite the inlet, a spring tending to separate the bleeder valve and the check valve for seating both valves, a diaphragm valve coaxial with the check valve and the bleeder valve and movable with the latter, said housing having an annular seat surrounding the check valve, said seat being engageable by the peripheral portion of the diaphragm valve, said bleeder valve being unseated when the diaphragm valve is forced in the direction of its seat.

4. In a valve of the class described, a housing having an inlet and an outlet connection, a check valve at the inlet connection to prevent water from returning from the housing to the inlet, a bleeder valve in the housing, and a diaphragm valve operatively connected with the bleeder valve and mounted to seat with its peripheral portion around the inlet to close said inlet, a resilient connection between the check valve and the diaphragm valve, and a positive connection between the latter and the bleeder valve, whereby water pressure, at the outlet side of the diaphragm valve, will cause the latter to seal the inlet and close the check valve at the inlet and open the bleeder valve.

5. In a valve of the class described, a housing having an inlet and an outlet connection, a check valve at the inlet connection to prevent water from returning from the housing to the inlet, a bleeder valve in the housing, a diaphragm valve operatively connected with the bleeder valve and mounted to seat with its peripheral portion around the inlet to close said inlet, a resilient connection between the check valve and the diaphragm valve, a positive connection between the latter and the bleeder valve, whereby water pressure, at the outlet side of the diaphragm valve, will cause the latter to seal the inlet and close the check valve at the inlet and open the bleeder valve, and a plurality of weighted levers mounted within the housing and engaging the inner side of the peripheral portion of the diaphragm valve to facilitate seating of the same.

6. In a valve of the class described, a housing having an inlet and an outlet connection, a check valve at the inlet connection to prevent water from returning from the housing to the inlet, a bleeder valve in the housing, a diaphragm valve operatively connected with the bleeder valve and mounted to seat with its peripheral portion around the inlet to close said inlet, and means mounted on the housing in association with the bleeder valve opening, and provided with a cam adapted, when the means is operated, to hold the bleeder valve in unseated position and force the check valve against its seat.

7. In a valve of the class described, a housing having an inlet and an outlet connection, a check valve at the inlet connection to prevent water from returning from the housing to the inlet, a bleeder valve positioned in axial alignment with the check valve for closing an opening in the housing opposite the inlet, a spring tending to separate the bleeder valve and the check valve for seating both valves, a vacuum breaker valve positioned at one side of the housing for connecting the atmosphere to the interior thereof when the latter valve is open, and means connecting the bleeder valve to the vacuum breaker valve for unseating the latter when the former is unseated.

8. In a valve of the class described, a housing having an inlet and an outlet connection, a bleeder valve in the housing, a diaphragm valve operatively connected with the bleeder valve and mounted to seat with its peripheral portion around the inlet to close said inlet, a vacuum breaker valve connected to the housing for connecting the atmosphere to the interior of the latter when the valve is open, and means connecting the bleeder valve to the vacuum breaker valve for unseating both valves simultaneously.

9. In a valve of the class described, a housing having an inlet and an outlet connection, a check valve at the inlet connection to prevent water from returning from the housing to the inlet, a bleeder valve positioned in axial alignment with the check valve for closing an opening in the housing opposite the inlet, a spring tending to separate the bleeder valve and the check valve for seating both valves, a vacuum breaker valve positioned at one side of the housing for connecting the atmosphere to the interior thereof when the latter valve is open, means connecting the bleeder valve to the vacuum breaker valve for unseating the latter when the former is unseated, and a weighted lever pivotally mounted below the bleeder valve and provided with a cam for unseating the bleeder valve and vacuum breaker valve and seating the check valve when the lever is lowered.

10. In a valve of the class described, a housing having an inlet and an outlet connection, a bleeder valve in the housing, a diaphragm valve operatively connected with the bleeder valve and mounted to seat with its peripheral portion around the inlet to close said inlet, a vacuum breaker valve connected to the housing for connecting the atmosphere to the interior of the latter when the valve is open, means connecting the bleeder valve to the vacuum breaker valve for unseating both valves simultaneously, and other means mounted on the housing in association with the bleeder valve, and provided with a cam for holding the bleeder valve and vacuum breaker valve in unseated positions.

11. In a valve of the class described, a housing having an inlet and an outlet connection, a check valve at the inlet connection to prevent water from returning from the housing to the inlet, a bleeder valve for the housing, a spring in association with the check valve and the bleeder valve for seating both valves, and a diaphragm valve in association with the bleeder valve and movable with the latter, the peripheral portion of the diaphragm valve being normally seatable around the inlet connection.

12. In a valve of the class described, a housing having an inlet and an outlet connection, a check valve at the inlet connection to prevent water from returning from the housing to the inlet, a bleeder valve for the housing, a spring in association with the check valve and the bleeder valve for seating both valves, a diaphragm valve in association with the bleeder valve and movable with the latter, the peripheral portion of the diaphragm valve being normally seatable around the inlet connection, and means on the housing in association with the bleeder valve, and provided with a cam for holding the bleeder valve and the check valve in seated positions.

13. In a valve structure, a housing having an inlet and an outlet, a frame reciprocably mounted within the housing between the inlet and outlet, a diaphragm carried by the frame, said housing having a seat surrounding the inlet, the peripheral portion of the diaphragm being adapted to engage said seat, a plurality of levers mounted intermediate their ends within the housing, the inner ends of the levers being weighted and the other ends of the levers engaging the peripheral portion of the diaphragm for urging the same against said seat.

14. In a valve of the class described, a housing having an inlet and an outlet connection, a check valve at the inlet connection to prevent water from returning from the housing to the inlet, a bleeder valve in the housing, a sealing valve operatively connected with the bleeder valve, and means on the housing in association with the bleeder valve, adapted, when the means is operated, to hold the bleeder valve in an open position and hold the check valve against its seat.

15. In a back siphonage prevention valve, a housing having an inlet and an outlet connection and also having a bleeder outlet to the atmosphere, a bleeder valve in the housing, a sealing valve for the inlet, means operatively and resiliently connecting the sealing valve with the bleeder valve, and means for manually opening the bleeder valve, said sealing valve being adapted to be held, by said resilient connecting means, in its closed position when the bleeder valve is closed.

16. In a back siphonage prevention valve, a housing having an inlet and an outlet connection, a bleeder valve in the housing, a diaphragm valve operatively connected with the bleeder valve and mounted to seat with its peripheral portion around the inlet to close said inlet, and manual means mounted on the housing in association with the bleeder valve opening, and provided with a cam adapted, when the means is operated, to hold the bleeder valve in unseated position and urge the diaphragm valve to its closed position.

17. In a back siphonage prevention valve, a housing having an inlet and an outlet connection and also having a bleeder opening to the atmosphere, a check valve at the inlet connection to prevent fluid from returning from the housing to the inlet, a bleeder valve operatively connected with the check valve for closing the bleeder outlet, and spring means tending to separate said valves for holding both valves normally in their respective closed positions.

18. In a back siphonage prevention valve, a housing having an inlet and an outlet connection and a bleeder outlet opposite the inlet connection, a check valve at the inlet connection to prevent fluid from returning from the housing to the inlet, a bleeder valve co-axial with the check valve for closing the bleeder outlet, a sealing valve co-axial with the check valve and the bleeder valve the axial portion of the sealing valve being movable with the latter, and means for opening the bleeder valve, said bleeder valve being capable of being opened when the peripheral portion of the sealing valve is seated.

CLARENCE E. ELLIS.